US010148764B2

(12) United States Patent
Britt, Jr. et al.

(10) Patent No.: US 10,148,764 B2
(45) Date of Patent: Dec. 4, 2018

(54) BACKUP WIDE AREA NETWORK CONNECTION FOR ACCESS POINTS AND ROUTERS

(71) Applicant: Google LLC, Mountain View, CA (US)

(72) Inventors: Joe Freeman Britt, Jr., Los Altos, CA (US); Robert Dale Newberry, Jr., San Jose, CA (US); Paul Heninwolf, San Carlos, CA (US); Matthew Joel Hershenson, Los Altos, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 14/501,066

(22) Filed: Sep. 30, 2014

(65) Prior Publication Data

US 2016/0094388 A1 Mar. 31, 2016

(51) Int. Cl.
*H04L 29/08* (2006.01)
*H04L 12/24* (2006.01)
*H04L 29/06* (2006.01)

(52) U.S. Cl.
CPC ........ *H04L 67/141* (2013.01); *H04L 41/0668* (2013.01); *H04L 41/0816* (2013.01);
(Continued)

(58) Field of Classification Search
CPC ............... H04L 41/0813; H04L 67/141; H04L 41/0668; H04L 41/0816; H04L 41/0672; H04L 41/0883; H04L 69/14
See application file for complete search history.

(56) References Cited

U.S. PATENT DOCUMENTS 6,160,993 A * 12/2000 Wilson ............... H04B 7/18578
455/12.1
7,409,451 B1 * 8/2008 Meenan ............... H04L 12/5692
379/100.15
(Continued)

FOREIGN PATENT DOCUMENTS

EP 2469903 A1 6/2012

OTHER PUBLICATIONS

Davies, Chris, "Netgear MBRN3000 and DGN2200M WiFi-N routers get 3G/4G WWAN backup", SlashGear.com, pub. Jan. 6, 2010, https://www.slashgear.com/netgear-mbrn3000-and-dgn2200m-wifi-n-routers-get-3g4g-wwan-backup-0668141/, accessed May 1, 2017, pp. 1-13.*

(Continued)

*Primary Examiner* — Asad M Nawaz
*Assistant Examiner* — Thomas R Cairns
(74) *Attorney, Agent, or Firm* — Honigman Miller Schwartz and Cohn LLP

(57) ABSTRACT

Systems and techniques are provided for a backup wide area network connection for access points and routers. A network interface may be able to connect to wide area network over a broadband connection. A cellular modem may be able to connect to the wide area network through a cellular network. The cellular modem may be distinct from the network interface. A processor may be connected to the network interface and the cellular modem and may be able to detect that the broadband connection between the network interface and the wide area network is not connected and, in response, activate the cellular modem to connect to the cellular network, receive configuration data using the cellular modem, and apply a configuration setting from the received configuration data to establish the broadband connection through the network interface.

26 Claims, 5 Drawing Sheets

(52) U.S. Cl.
CPC .......... *H04L 69/14* (2013.01); *H04L 41/0672* (2013.01); *H04L 41/0883* (2013.01)

(56) References Cited

U.S. PATENT DOCUMENTS

| | | | | |
|---|---|---|---|---|
| 8,281,010 | B2* | 10/2012 | Ansari | G06Q 30/04 709/203 |
| 8,516,132 | B2* | 8/2013 | Selgas | H04L 29/06 709/227 |
| 8,923,837 | B2* | 12/2014 | Wieczorek | H04W 8/18 455/418 |
| 8,971,209 | B2* | 3/2015 | Magnuson | H04W 24/02 370/216 |
| 9,167,437 | B2* | 10/2015 | Wood | H04L 43/08 |
| 9,210,646 | B2* | 12/2015 | Ruffini | H04W 40/28 |
| 9,456,464 | B2* | 9/2016 | Biswas | H04W 76/026 |
| 2003/0231206 | A1* | 12/2003 | Armstrong | H04L 67/36 715/744 |
| 2005/0286466 | A1* | 12/2005 | Tagg | H04L 12/2856 370/329 |
| 2006/0159048 | A1* | 7/2006 | Han | H04L 29/12311 370/331 |
| 2007/0291704 | A1* | 12/2007 | Guo | H04L 29/12028 370/338 |
| 2013/0163442 | A1* | 6/2013 | Livingston | H04W 48/16 370/252 |
| 2013/0176897 | A1* | 7/2013 | Wang | H04W 12/06 370/254 |
| 2014/0115393 | A1* | 4/2014 | Kuwahara | G06F 11/273 714/27 |
| 2014/0167928 | A1* | 6/2014 | Burd | G06F 17/30893 340/12.5 |
| 2015/0350003 | A1* | 12/2015 | Anderson | H04L 29/06965 726/3 |

OTHER PUBLICATIONS

Cramer, "Cradlepoint CBA750B Product Manual, Cellular Broadband Adapter", Cradlepoint, published Mar. 14, 2013, pp. 14-17, 30-31 and 119.*

Cramer et al., "WiPipe Central User Manual", Cradlepoint, published Jan. 14, 2013, p. 5.*

"Cradlepoint ARC CBA750B Series : Integrated Mobile Broadband Adapter," Cradlepoint , pp. 9.

* cited by examiner

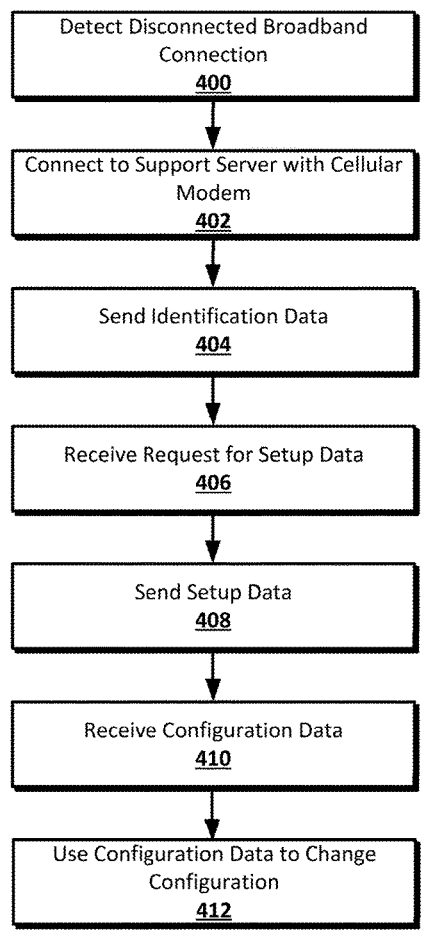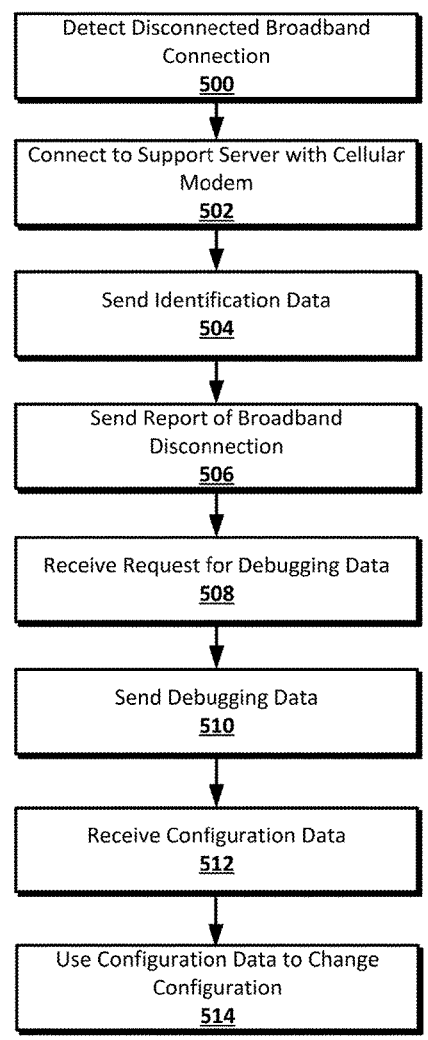

BACKUP WIDE AREA NETWORK CONNECTION FOR ACCESS POINTS AND ROUTERS

BACKGROUND

Routers and access points may be used by consumers to access and share a broadband connection to the Internet. For example, a consumer may connect a router that includes 802.11 based WiFi and an Ethernet based switch or hub to a cable modem in order to share the broadband connection to the Internet accessed through the cable modem with a variety of wireless and wired devices, such as laptops, tablets, smartphones, smart televisions, and gaming systems.

There are a number of internet service providers (ISPs) that provide broadband internet service. Different broadband ISPs may require different configuration settings on routers and access points used to access and share the broadband connection to the Internet. For example, one broadband ISP may require the router or access point be provided with a username and password, while another broadband ISP may not require a username and password but may require the selection of an appropriate connection type in the configuration of the router or access point, or may require the router or access point to be configured to use a specified MAC address, IP address, subnet mask, Gateway IP address, DNS server or other setting. The configuration may need to be performed manually by the consumer when the router or access point is first set up to work with the consumer's broadband ISP, or when settings for the router or access point are lost, for example, due to power failure or other such events which may cause erasure or corruption of the settings. This may be difficult and time consuming, and the consumer may not have access to the Internet during the setup, as the router or access point may be disconnected from the Internet until the setup is completed properly. This may hinder the consumer's ability to get need information and/or support in setting up the router or access point. The user may be able to receive support from a customer support agent over the phone, but the customer support agent may be unable to directly access the router or access point to assist in setup. Trying to guide the customer through a series of setup screens for the access point or router, including the entering of setup data, may be time consuming and prone to error and failure.

Connection problems may also cause the router or access point to lose a connection with a broadband ISP, preventing the router or access point and any connected devices from accessing the Internet. Troubleshooting a disconnected router or access point may also be hindered by lack of access to the Internet. The consumer may receive support from a customer support agent over the phone, but the customer support agent may be unable to directly access the router to diagnose any issues that may be responsible for the disconnection, and may have to rely on debugging information being relayed verbally by the consumer.

BRIEF SUMMARY

According to an embodiment of the disclosed subject matter, a network interface may be able to connect to wide area network over a broadband connection. A cellular modem may be able to connect to the wide area network through a cellular network. The cellular modem may be distinct from the network interface. A processor may be connected to the network interface and the cellular modem and may be able to detect that the broadband connection between the network interface and the wide area network is not connected and, in response, activate the cellular modem to connect to the cellular network, receive configuration data using the cellular modem, and apply a configuration setting from the received configuration data to establish the broadband connection through the network interface.

A storage may be connected to the processor and may be able to store configuration settings. The processor may be able to apply the configuration setting from the received configuration data by storing the at least one configuration setting in the storage. The processor may be able to detect a failure to establish the broadband connection that was detected to be not connected and to apply additional configuration settings from the received configuration data in response to detecting the failure.

The network interface may be able to connect to a computing device on a local area network and the processor may be able to send, using the network interface, to the computing device guided setup web pages including data related to a guided setup received using the cellular modem, receive data including a configuration setting submitted using the guided setup web pages, and apply the configuration setting for which the data was received.

The data including a configuration setting may include a username and password for a broadband ISP, a static Internet Protocol address, or a connection type. The cellular modem may be able to connect to a computing device connected to the wide area network. The computing device connected to the wide area network may be a support server or a customer support agent computing device, and the processor may be able to receive instructions through the cellular modem from the customer support agent computing device and perform the received instructions. The processor may be able to use the cellular modem to send identification data, setup data, debugging data, or a report of a broadband disconnection. The setup data may include a configuration setting of an apparatus, and where the debugging data may include a current configuration setting of the apparatus, an error log, a debugging log, or telemetry data for the apparatus.

The network interface may include a wireless network interface or a wired network interface. The cellular modem may include a cellular radio. The cellular radio may be a GPRS radio, an EDGE radio, a GSM radio, an LTE radio, a HSPA radio, or an HSDPA radio. The broadband connection used by the network interface to connect to the wide area network may include a connection to a broadband modem connected to a broadband internet service provider server. The broadband modem may be a cable modem, satellite modem, DSL modem, fiber optic modem, or high-speed wireless wide area modem.

It may be detected that a broadband connection to a wide area network through a network interface is not connected. The wide area network may be connected to using a cellular modem. The cellular modem may be distinct from the network interface. Identification data, setup data, debugging data, or a report of a broadband disconnection may be sent to a support server using the cellular modem. Configuration data including at least one configuration setting may be received through the cellular modem. The configuration setting from the configuration data may be applied to change a configuration. An attempt may be made to reconnect the broadband connection to the wide area network through the network interface after applying the configuration setting. The broadband connection to the wide area network may be detected to be not connected after the reconnection attempt. A configuration setting from the configuration data that was not previously applied may be applied. An attempt may be made to reconnect the broadband connection to the wide area network through the network interface.

A request may be sent through the cellular modem to the support server for additional configuration data. The additional configuration data may be received. A configuration setting from the additional configuration data may be applied. An attempt may be made to reconnect the broadband connection to the wide area network through the network interface after applying the configuration setting from the additional configuration data.

An item of data related to a guided setup web page may be received through the cellular modem from the support server. A guided setup web page including the at least one item of data may be sent to a computing device connected to a local area network. The item of data may be an indication of a configuration setting to be input by a user of the computing device. The configuration setting input by the user may be received. The configuration setting input by the user may be applied. An attempt may be made to reconnect the broadband connection to the wide area network.

An instruction from a customer support agent computing device may be received through the cellular modem at least. The instruction may be performed. The instruction may include a configuration setting to be applied, an instruction to initiate a reboot, an instruction to attempt to reconnect the broadband connection, or an instruction to send data requested data including error log data, telemetry data, or debugging data to the customer support agent computing device. The broadband connection to the wide area network may be through a broadband modem and a broadband internet service provider server. The broadband modem may be a cable modem, satellite modem, DSL modem, fiber optic modem or high-speed wireless wide area modem. The network interface may include a wireless network interface or a wired network interface. The configuration setting comprises one item selected from the group of: a connection type setting, a DNS IP address, and a Gateway IP address. The cellular modem may include a pre-provisioned cellular radio using a low-bandwidth cellular communication standard.

According to an embodiment of the disclosed subject matter, a means for detecting a broadband connection to a wide area network through a network interface is not connected, a means for connecting to the wide area network using a cellular modem, where the cellular modem may be distinct from the network interface, a means for sending identification data, setup data, debugging data, or a report of a broadband disconnection to a support server using the cellular modem, a means for receiving configuration data including a configuration setting through the cellular modem, a means for applying the configuration setting from the configuration data to change a configuration, a means for attempting to reconnect the broadband connection to the wide area network through the network interface after applying configuration setting, a means for detecting the broadband connection to the wide area network is not connected after the reconnection attempt, a means for applying a configuration setting from the configuration data that was not previously applied, a means for attempting to reconnect the broadband connection to the wide area network through the network interface after applying the configuration setting that was not previously applied, a means for sending a request through the cellular modem to the support server for additional configuration data, a means for receiving the additional configuration data, a means for applying a configuration setting from the additional configuration data, a means for attempting to reconnect the broadband connection to the wide area network through the network interface after applying the configuration setting from the additional configuration data, a means for receiving through the cellular modem from the support server an item of data related to a setup web page, a means for sending, to a computing device connected to a local area network, a guided setup web page including the item of data, where the item of data is an indication of a configuration setting to be input by a user of the computing device, a means for receiving the configuration setting input by the user, a means for applying the configuration setting input by the user, a means for attempting to reconnect the broadband connection to the wide area network, a means for receiving through the cellular modem an instruction from a customer support agent computing device, and a means for performing instruction, where the instruction may include a configuration setting to be applied, an instruction to initiate a reboot, an instruction to attempt to reconnect the broadband connection, or an instruction to send data requested data comprising error log data, telemetry data, or debugging data to the customer support agent computing device, are included.

A means for receiving identification data, setup data, debugging data, or a report of a broadband disconnection from a network access device, a means for determining a configuration setting to connect a broadband connection for the network access device based on the identification data, the setup data, the debugging data, or the report of a broadband disconnection, a means for sending the configuration setting as configuration data to the network access device, a means for receiving a report from the network access device that the broadband connection was not successfully connected after the network access device applied the configuration setting, a means for determining another configuration setting for the network access device, a means for sending an item of data related to guided setup to the network access device, and a means for connecting the network access device to a customer support agent computing device, are also included.

Systems and techniques disclosed herein may allow for a backup wide area network connection for access points and routers. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an example of a process for setup on a network access device with a backup wide area connection.

FIG. 5 shows an example of a process for troubleshooting on a network access device with a backup wide area connection.

DETAILED DESCRIPTION

Figure 1:
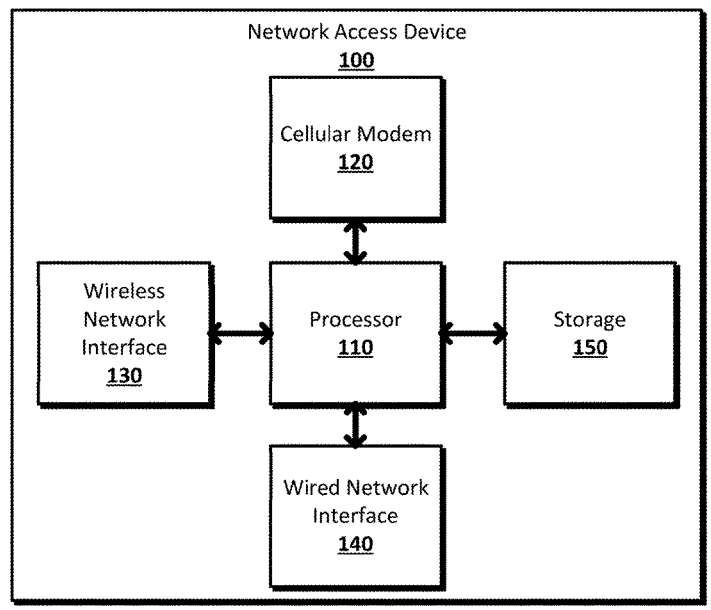
FIG. 1 shows an example diagram of a network access device with a backup wide area connection.

A backup wide area network connection in a network access device may allow configuration and troubleshooting of the network access device when the network access device has been disconnected from a wide area network such as the Internet. The network access device may be, for example, a router or access point used to share a broadband connection to the Internet within a residence, office space, business, other structure, or open area. The backup wide area network connection may be a cellular modem installed in the network access device which may be able to connect to the Internet through a cellular network of a cellular provider. The cellular modem may be implemented with a cellular radio chip. During initial setup of the network access device, the network access device may be disconnected from the Internet due to not having the proper configuration to access servers of the broadband ISP providing the broadband connection to the Internet. The cellular modem in the network access device may be used to access the Internet, and connect to a server, for example, a support server, that may be able to automatically configure the network access device to connect to the Internet through the broadband ISP. The server may also be able to initiate a guided setup of the network access device through the connection with the cellular modem. The guided setup may be presented to a user through a computing device connected locally to the network access device. The cellular modem in the network access device may also report to the server when the network access devices loses an established broadband connection, and the server may troubleshoot the lost connection. Telemetry and debugging data for the network access device may be sent to the server using the cellular modem. A customer support agent may also be able to access the network access device through the connection between the cellular modem and the server.

The cellular modem may be, for example, a GPRS, EDGE, GSM, LTE, HSPA, or an HSDPA modem or other suitable wide area radio, and may utilize a low-cost, low-bandwidth connection. The cellular modem may be pre-provisioned with access to the cellular network of a cellular provider, so that cellular modem may function immediately when the network access device is first used. The user may not be required to setup the cellular modem by, for example, making an arrangement or going through a setup process with a cellular provider. The cellular modem may be installed as a component of the network access device, which may also include any suitable antennas for the cellular modem.

A broadband ISP may provide broadband internet service in any suitable manner, using any suitable broadband modem. For example, the broadband ISP may allow access to the Internet through a cable modem, satellite modem, DSL modem, fiber optic modem, high-speed wireless wide area modem, or any other suitable device. The network access device may be connected to the broadband modem, for example, with an Ethernet cable or wirelessly, or the broadband modem may be a component of the network access device. When the network access device is initially connected to the broadband modem, the network access device may be unable to access the Internet through the broadband ISP due to lack of proper configuration. For example, the broadband ISP may require specific configuration settings be selected or entered into the network access device. Entering the configuration settings may properly configured the network access device to access the Internet using the broadband modem.

The network access device may use the cellular modem in order to complete initial configuration of the network access device and gain access to the Internet. For example, the network access device may detect that the broadband connection to the Internet is disconnected and that the network access device does not have any entered configuration settings. The network access device may use the cellular modem to access the Internet through the cellular network of the cellular provider that the cellular modem was pre-provisioned to work with. The network access device may use the Internet access provided by the cellular modem to connect to a server that may provide automatic or assisted configuration of the network access device. The server may be, for example, owned and operated by the manufacturer of the network access device, or by any other suitable party.

The network access device may send to the server, through the cellular modem, identification data and setup data. The identification data may, for example, identify the network access device to the server, so that the server may verify that the server is allowed and able to communicate with and configure the network access device. The identification data may be in any suitable format, such as, for example, a hash or encrypted key stored on the network access device by the manufacturer. The setup data may be any suitable data for allowing the server to determine the proper configuration settings that will allow the network access device to access the Internet using the broadband modem. For example, the setup data may include any data the network access device has received from the broadband modem, such as error messages and IP addresses that may be used to identify the broadband ISP, current configuration settings on the network access device, and location data for the network access device based on the cellular towers to which the cellular modem is connected. The identification data or the setup data may also include information allowing the server to determine the model and operating parameters of the network access device. For example, the setup data may include the model number, firmware version number, and hardware identifiers for individual components of the network access device. The identification data and setup data may be sent automatically upon connection to the server, or one or both of the identification data and setup data may be sent after being requested by the server. For example, the server may request the setup data after verifying the identity of the network access device, and the network access device may wait to send the setup data until after receiving the request. The server may also request specific items of setup data.

The server may use the setup data and the identification data received from the network access device to determine proper configuration settings for the network access device, and send the configuration settings to the network access data. For example, the server may attempt to identify the broadband ISP based on location data in the setup data. The server may then determine appropriate configuration settings for the network access device based on the broadband ISP and the network access device. For example, the server may have access to a database of configuration settings for various broadband ISPs. The configuration settings may include, for example, whether the network access device should use Dynamic Host Configuration Protocol (DHCP), Point-to-Point Protocol Over Ethernet (PPPoE), Point-to-Point Protocol over Asynchronous Transfer Mode (PPPoA), Layer 2 Tunneling Protocol (L2TP), or any other connection protocol, Gateway and Doman Name System IP Addresses, and whether a username and password is required.

The server may be unable to determine which specific broadband ISP the network access device is attempting to connect to, but may be able to determine a list of possible broadband ISPs, for example, based on the location data. For example, the location data for the network access device may locate the network access device in a geographic region that may be served by three broadband ISPs. The server may access configuration settings for the network access device for each of the three broadband ISPs. The server may send the determined configuration settings to the network access device as configuration data.

The configuration data sent from the server may be received by the network access device using the cellular modem. The configuration settings in the configuration data may be used by the network access device to complete configuration of the network access device. For example, the network access device may adjust its own settings as specified by the configuration settings. For example, the network access device may be set to use a DHCP connection. A configuration setting in the configuration data received by the network access device may specify that the broadband ISP requires the use of a PPPoE connection. The network access device may adjust the connection setting from DHCP to PPPoE in response to receiving the configuration data. This adjustment may occur without any intervention by a user.

Once the configuration settings from the configuration data have been used to adjust the configuration of the network access device, the network access device may attempt to connect to the Internet though the broadband modem. If the network access device is able to successfully connect to the Internet, the cellular modem may disconnect from the server. The successful connection to the Internet through the broadband modem may be reported to the server by the cellular modem before disconnection, or using the now-functioning broadband connection. If the network access device is still unable to access the Internet through the broadband modem, the network access device may apply any additional configuration settings from the configuration data or request additional configuration data from the server. For example, the server may determine that there are three broadband ISPs serving the geographic area where the network access device is located. The server may send the network access device configuration data including configuration settings for any subset of the three broadband ISPs, including just one broadband ISP or all three broadband ISPs. The network access device may apply the configuration settings for a first of the three broadband ISPs, which may fail to allow the network access device to use the broadband connection. The network access device may then apply the configuration settings for the remaining broadband ISPs, using configuration data already received from the server or requesting additional configuration data from the server, until the network access device is able to access the Internet through the broadband modem, or until all the configuration settings for all of the three broadband ISPs have been tried. The network access device may then request additional configuration settings from the server, and may send the server any debugging and telemetry data that may be useful to the server in determining why the previously sent configuration settings did not work and which configuration setting should be tried next. If the server is unable to provide configuration settings that allow the network access device to access the Internet through the broadband connection, the server may, for example, allow a human customer support agent access to the network access device. The human customer support agent may use a computer connected to the server to change the configuration of the network access device remotely, to attempt to configure the network access device properly to access the Internet through the broadband modem. The cellular modem may also establish a voice connection to the human customer agent, in addition to the data connection to the server. This may allow the customer support agent to work with the customer in changing the configuration setting of the network access device.

The cellular modem connection between the network access device and the server may also be used in a guided setup of the network access device. For example, the server may be unable to determine proper configuration settings for the network access device, or may determine that some form of user input, such as a username and password, is required to properly configure the network access device. The server may initiate a guided setup, which may be accessed by a user on a computing device using a local connection to the network access device. For example, the user may use a laptop connected to the local wired or wireless network created by the network access device. The guided setup may be accessible through a web browser running on the computing device. The web pages may be hosted on the network access device, or on the server, as the web pages may be designed to use minimal bandwidth for transmission via a cellular network. The web pages may guide the user through configuring the network access device, for example, soliciting input from the user for configuration settings that the server is unable to determine on its own. For example, a web page may request the user enter a username and password required by the broadband ISP, or a static IP address assigned to the user by the broadband ISP. The entered username and password or static IP address may be used to configure the network access device appropriately.

The cellular modem may report to the server when the network access device loses a previously functioning broadband connection. For example, the connection between the broadband modem and the broadband ISP may be lost, the connection between the broadband ISP and the Internet may be lost, or the connection between the network access device and the broadband modem may be lost, disconnecting the network access device from the Internet. The connection may also be lost when the user of the network access device switches broadband ISPs, as the network access device may not be configured to access the Internet through the new broadband ISP.

The network access device may use the cellular modem to report the lost connection to the server. The server may attempt to resolve the connection problem, for example, requesting debugging and telemetry data from the network access device to determine configuration settings that may be used to restore the broadband connection. For example, the server may determine that the network access device lost the broadband connection due to changes made to the configuration of the network access device by, for example, a user. The server may send the network access device configuration data including configuration settings that may restore the broadband connection. The server may also determine that the broadband connection cannot be restored by changes to the configuration of the network access device, for example, because the disconnection was caused by an issue between the broadband modem and the broadband ISP, or the broadband ISP and the Internet. The server may store the report of the disconnection, for example, to compile data on broadband ISP reliability.

The server may also forward a report of the disconnection to the user of the network access device, for example, via text message, email, or any other suitable communications channel that the user may be able to access without having a functioning broadband connection through the network access device. For example, the user may be at an office, and may receive an email on an office computer reporting that the user's network access device at home has lost its broadband connection. The cellular modem may not be used to report a lost broadband connection to the server if the network access device determines that it has been physically disconnected from the broadband modem, for example, due to a cable being removed, a wireless connection being lost, or the broadband modem being powered off.

The cellular modem may also be used as a general Internet connection for data from the customer's network that may be considered important. For example, when the network access device has a disconnected broadband connection, the cellular modem may be used to access network devices such as smart thermostats from outside the network. This may allow a user to use the Internet to, for example, remotely control parts of a home automation network connected to the network access device even when the network access device has lost its broadband connection by routing traffic through the cellular modem.

FIG. 1 shows an example diagram of a network access device with a backup wide area connection. A network access device 100 may include a processor 110, cellular modem 120, any number of network interfaces, for example, wireless network interface 130 or wired network interface 140, and storage 150, installed as components of the network access device 100. The cellular modem 120, the wireless network interface 130, the wired network interface 140, and the storage 150 may be connected to the processor 110 in any suitable manner. For example, the components of the network access device 100 may be individual chips on a printed circuit board with appropriate circuits, cards such as PCI or MiniPCI cards slotted into appropriate slots, or may be implemented as a System-on-a-Chip (SoC) or Application Specific Integrated Circuit (ASIC). The network access device 100 may be, for example, a router, such as a wireless router, or access point, for sharing network connectivity among a number of computing devices. The network access device 100 may also include, for example, wireless antennas and wired networking ports.

The processor 110 may control the functionality of the network access device 100. For example, the processor 110 may implement firmware for the network access device and configuration settings from the network access device 100 stored in the storage 150. The storage 150 may be any suitable combination of persistent storage, including flash memory. The processor 110 may, for example, run a local DHCP server and provide Network Address Translation services to computing devices connected to the network access device 100. The processor 110 may route data between a Wide Area Network (WAN), such as, for example, the Internet, and computing devices connected to a Local Area Network (LAN) created by the network access device 100.

The cellular modem 120 may be any suitable device for accessing a wide area radio network, such as, for example, a cellular network. For example, the cellular modem 120 may be a wireless radio chip for use with GPRS or EDGE cellular networks, or any other low-cost, low-bandwidth wide area radio network. The wireless radio chip may also be for use with GSM, LTE, HSPA, or HSDPA cellular networks. The cellular modem 120 may be connected to and controlled by the processer 110, and may be used to connect the network access device 100 to the Internet when a broadband connection has failed. The cellular modem 120 may be pre-provisioned with access to a cellular network, and may therefore be able to connect the network access device 100 to the Internet when the network access device 100 is first powered on without requiring any intervention from a user. The network access device 100 may include a cellular antenna for use by the cellular modem 120.

The wireless network interface 130 may be any suitable device for allowing the network access device 100 to be connected to computing devices and broadband modems wirelessly. For example, the wireless network interface 130 may be a wireless network interface controller (WNIC) which my support wireless connections using suitable wireless standard, including, for example, 802.11 wireless connections. The wireless network interface 130 may be used by the network access device 100 to establish a wireless local area network (WLAN), or to allow the network access device 100 to act as wireless access point. The wireless network interface 130 also may connect to a broadband modem with wireless capabilities to establish a broadband connection to the Internet for the network access device 100.

The wired network interface 140 may be any suitable device for allowing the network access device 100 to be connected to computing devices via wires. For example, the wired network interface 140 may a network interface controller (NIC) which may support wired connections using any suitable wired networking standard, including, for example, Ethernet wired connections. The wired network interface 140 may be used by the network access device 100 to establish a wired local area network (LAN), or to allow the network access device 100 to act as a wired access point. The wired network interface 140 also may connect to a broadband modem, for example, using an Ethernet cable connected to a WAN port of the network access device 100, to establish a broadband connection to the Internet for the network access device 100.

Figure 2:
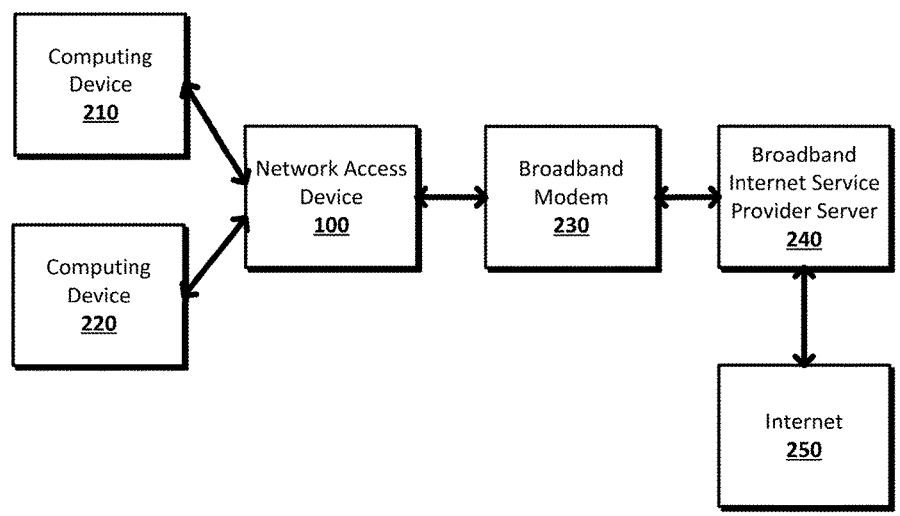
FIG. 2 shows an example arrangement for accessing the internet with a network access device.

FIG. 2 shows an example arrangement for accessing the internet with a network access device. The network access device 100 may be connected to a broadband modem 230 in any suitable manner. For example, the broadband modem 230 may be connected via Ethernet cable to the wired network interface 140 of the network access device 100, via a wireless connection to the wireless network interface 130 of the network access device 100, or installed in the network access device 100, for example, as a chip, card, ASIC, or SoC separate from, or integrated with, the processor 110. The broadband modem may be a modem such as, for example, a cable modem, fiber optic modem, satellite modem, or DSL modem, or high-speed wireless wide area modem capable of utilizing a broadband connection to a WAN, such as the Internet.

The broadband modem 230 may be connected to a broadband ISP server 240 in any suitable manner, such as, for example, through coaxial cables, fiber optic cables, a telephone line, or through a satellite. The broadband ISP server 240 may be operated by a broadband ISP, and may provide the broadband modem 230 with data, such as, for example, an IP address, to be used by the network access device 100. The broadband ISP server 240 may be connected to the Internet 250. When the broadband modem 230 connects to the broadband ISP server 240, the network access device 100 may begin communicating with the broadband ISP server 240. If the network access device 100 is configured correctly to work with the broadband ISP that operates the broadband ISP server 240, the network access device 100 and the broadband ISP server 240 may communicate properly, and the network access device 100 may access to the Internet 250 through the broadband modem 230. If the network access device 100 is not configured correctly, the network access device 100 may not communicate correctly with the broadband ISP server 240, and may, for example, be unable to obtain an IP address. This may prevent the network access device 100 from accessing the Internet.

The computing devices 210 and 220 may be any suitable computing devices for connecting to the network access device 100, such as, for example, smartphones, tablets, laptop computers, desktop computers, video game systems, media streaming boxes, smart televisions, smart appliances, and home automation hardware. The computing devices 210 and 220 may connect to the network access device 100 using a wired or wireless connection, and may access the Internet 250 through the network access device 100. For example, the network access device 100 may provide DHCP and NAT services, and may assign each of the computing devices 210 and 220 and IP address on the LAN and WLAN created by the network access device 100. The network access device 100 may receive data from the computing devices 210 and 220 and send the data to the Internet 250 through the broadband modem 230. The network access device 100 may receive data from the Internet 250 and direct the data to the appropriate one of the computing devices 210 and 220. If the broadband connection from the network access device 100 to the broadband ISP server 240 is disconnected, the computing devices 210 and 220 may also be disconnected from the broadband ISP server 240, and may lose their broadband connection to the Internet 250. The computing devices 210 and 220 may also be able to access local web pages, for example, setup pages, hosted by the network access device 100, for example, from the storage 150.

Figure 3:
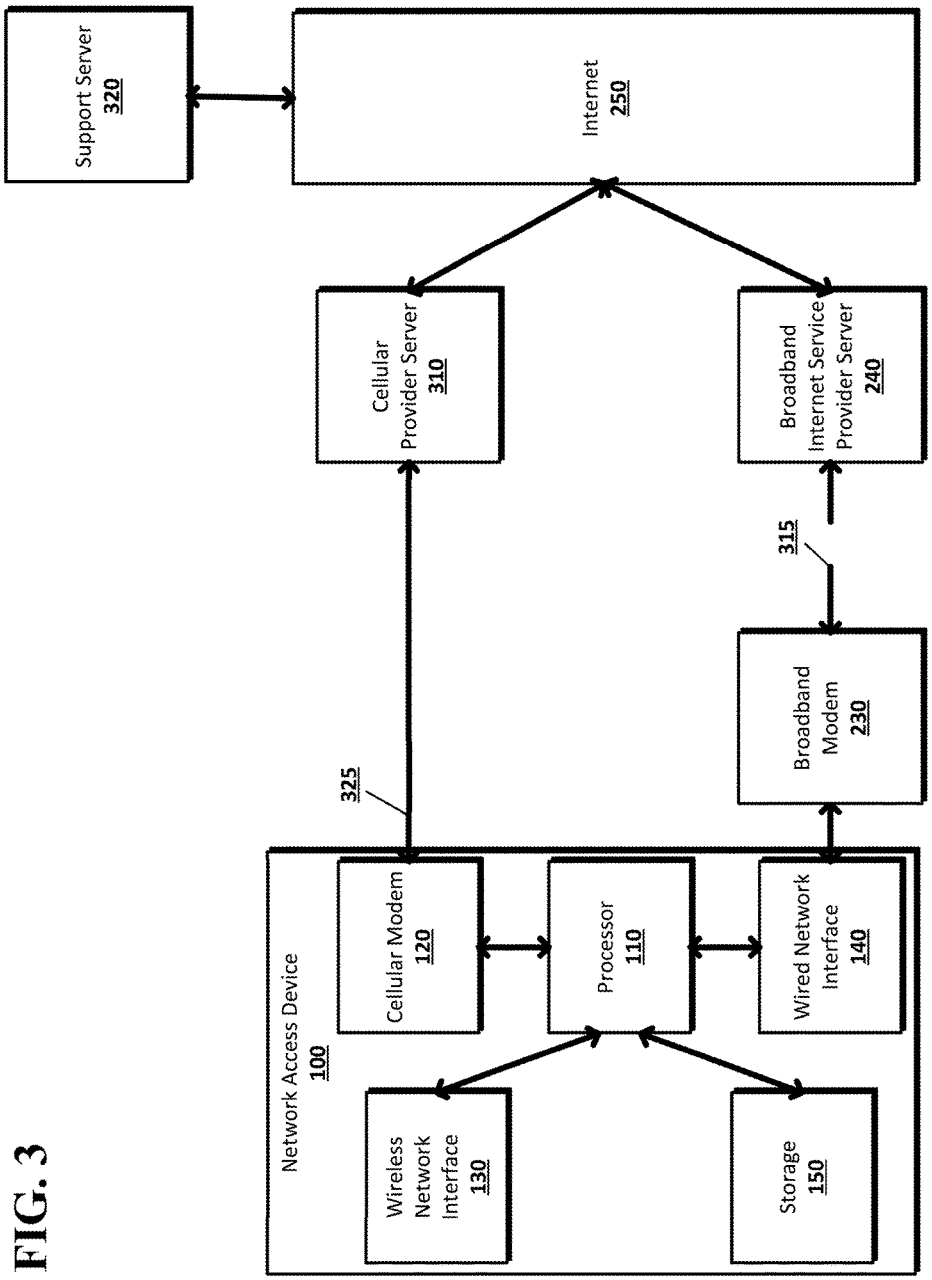
FIG. 3 shows an example arrangement for a backup wide area connection for a network access device.

FIG. 3 shows an example arrangement for a backup wide area connection for a network access device. The network access device 100 may be connected to the broadband modem 230 via the wired network interface 140. For example, an Ethernet cable may connect the broadband modem 230 to the WAN port of the network access device 100. The network access device 100 may not have a broadband connection to the Internet 250. For example, the network access device 100 may not be properly configured to connect to the broadband ISP server 240, as the network access device 100 may be new and not yet configured, may have experienced changes to the configuration settings, for example, from a user, may be configured to access a server for a different broadband ISP that may have required different configuration settings, or may have lost the broadband connection for any other reason. A link 315 between the broadband modem 230 and the broadband ISP server 240 may be broken, as the broadband ISP server 240 may not be able to communicate properly with the network access device 100 through the broadband modem 230. The network access device 100 may also be disconnected from the Internet 250 due to faults, either in the physical connection or communications between any of the network access device 100, the broadband modem 230, the broadband ISP server 240, and the Internet 250. For example, the broadband ISP server 240 may be down or a cable between the broadband modem 230 and the broadband ISP server 240 may be disconnected to be serviced or may have deteriorated.

The processor 110 of the network access device 100 may detect that the broadband connection to the Internet 250 through the wired network interface 140 and the broadband modem 230 is disconnected. For example, the processor 110 may be unable to renew an IP address through the broadband modem 230, or may have attempts to communicate with the broadband ISP server 240 or the Internet 250 time out when no data is received, and may determine that the link 315 has been disconnected. The processor 110 may activate the cellular modem 120. The cellular modem 120 may be used to establish a cellular link 325 to a cellular provider server 310. The cellular service provider server 310 may be a server operated by the cellular provider that the cellular modem 120 was pre-provisioned for, or by another provider of cellular data service that has an agreement with the pre-provisioned cellular provider. The link 325 may be a low-cost, low-bandwidth, data connection through a cellular network. The cellular provider server 310 may be connected to the Internet 250, providing the network access device 100 with access to the Internet 250 while the link 315 is disconnected.

The processor 110 may use the cellular modem 120 to connect the network access device 100 to the Internet 250 through the cellular provider server 310, and then to a support server 320. The support server 320 may be any suitable server or computing device, and may be operated by, for example, the manufacturer of the network access device 100, or by any other suitable party to provide support for the network access device 100. Data sent between the network access device 100 and the support server 320 may travel through the cellular link 325 between the cellular provider server 310 and the cellular modem 320. The support server 320 may receive the incoming connection from the network access device 100, including identification data for the network access device 100. The support server 320 may use the identification data for the network access device 100 to verify that the network access device 100 should be allowed to access the support server 320.

After verifying that the network access device 100 has access to the support server 320, the support server 320 may attempt to restore the broadband connection for the network access device 100, for example, connecting or reconnecting the link 315. For a network access device 100 that is new, for example, has just been connected to the broadband modem 230 for the first time, the support server 320 may attempt to determine proper configuration settings to connect the link 315, allowing the network access device 100 to communicate with the broadband ISP server 240. The support server 320 may, for example, request setup data from the network access device 100. The setup data may include, for example, location data for the network access device 100 assessed based on, for example, the location of cellular towers used by the cellular modem 120, and any other suitable data about the network access device 100 that may be retrieved from the storage 150 or from any other component by the processor 110 and sent to the support server 320 using the cellular modem 120. For example, debugging, telemetry, and error logs for the network access device 100 may be retrieved from the storage 150 and sent to the support server 320. For a network access device 100 that has already been configured successfully, the support server 320 may request debugging data, which may be similar to the setup data and may be used by the support server 320 to diagnose issues that may have resulted in the disconnection of the link 315.

The support server 320 may use the identification data, and the setup data or debugging data, to determine configuration settings for the network access device 100 that may connect, or reconnect, the link 315. For example, for a network access device 100 being connected to the cable modem 230 for the first time, the support server 320 may use location data to determine the possible broadband ISPs that may be operating the broadband ISP server 240, and may send the network access device 100 appropriate configuration settings to communicate with a broadband ISP server of each of the broadband ISPs. For a network access device 100 that has had a previously established broadband connection become disconnected, for example, through disconnection of the link 315, the support server may determine that the configuration settings on the network access device 100 were changed, or need to be changed to match a change in the functioning of the broadband ISP server 240. The configuration settings determined by the support server 320 may be sent to the network access device 100 as configuration data. The configuration data may include configuration settings for just one broadband ISP server, or for multiple broadband ISP servers.

The network access device 100 may receive the configuration data with the cellular modem 120 over the cellular link 325. The processor 110 may then apply configuration settings from the configuration data, for example, writing them over current configuration settings in the storage 150. After applying configuration settings from the support server 320, the processor 110 may attempt to connect, or reconnect, the broadband connection. For example, the processor 110 may use the wired network interface 140 to cause the broadband modem 230 to request an IP address from the broadband ISP server 240 if the connection uses DHCP, or may attempt to otherwise connect the network access device 100 to the broadband ISP server 240 and the Internet 250 using the new configuration settings.

If the network access device 100 successfully accesses the broadband ISP server 240, for example, connecting or reconnecting the link 315, and the Internet 250, the success of the configuration settings may be reported to the support server 320 through the cellular modem 120 or through the broadband modem 230 connected, for example, to the wired network interface 140. If the network access device 100 is not successful in connecting to the broadband ISP server 240, the processor 110 may apply any other configuration settings in the configuration data, or may use the cellular modem 120 to report the failure to the support server 320 and request additional configuration settings. The support server 320 may attempt to generate additional configuration settings for the network access device 100 which may be transmitted as configuration data to the network access device 100, may initiate a guided setup of the network access device 100, or may connect a customer support agent's computing device to the network access device 100 for further troubleshooting and diagnosis.

The support server 320 may initiate a guided setup of the network access device 100 when configuration settings automatically determined by the support server 320 fail to connect the network access device 100 to broadband ISP 240, when the support server 320 detects that the proper configuration settings for communicating with the broadband ISP server 240 require user input, or by default whenever the network access device 100 connects to the support server 320 using the cellular modem 120. The guided setup may require a user to use a locally connected computing device, for example, one of the computing devices 210 or 220, which has a display and can receive user input, to access guided setup web pages stored in the storage 150 of the network access device 100, or hosted on the support server 320. The web pages may be low bandwidth web pages. A user may access the guided setup web pages from the web browser of the computing device. The network access device 100 may receive data from the support server, which may be the entire web page, or may be indications of which web pages from the storage 150 should be shown to the user. The guided setup web pages may request the user enter data, such as a username and password, or static IP address, which may be stored by the processor 110 in the storage 150 as configuration settings. The support server 320 may attempt to ask the user for as little input as possible, for example, only asking for input for configuration setting that the support server 320 cannot determine properly automatically. After completion of the guided setup, the network access device 100 may attempt to access the broadband ISP provider 240 and the Internet 250 using the configuration settings from the support server 320 in conjunction with the configuration settings input by the user.

The support server 320 may also allow a customer support agent's computing device access to the network access device 100. For example, if the support server 320 is unable to determine configuration settings for the network access device 100 that allow the network access device 100 to connect to the broadband ISP server 240, the support server 320 may connect the network access device 100 to a customer support agent's computing device. The customer support agent may use their computing device to remotely inspect the network access device 100, for example, viewing the configuration settings from the storage 150 through the cellular link 325. The customer support agent may use their computing device to view debugging, telemetry, and error logs, and may be able to send configuration data with configuration settings to the processor 110, which may apply the configuration settings by storing them appropriately in the storage 150.

The support server 320 may determine that changing the configuration settings on the network access device 100 will not connect or reconnect the broadband connection. For example, a component of the network access device 100, such as the wired network interface 140, may have failed, the broadband modem 230 may have failed, physical or wireless connections in the path between the network access device 100 and the Internet 250, such as the link 315, may have failed, the disconnection may have been caused by problems with the broadband ISP server 240, or any other problem which may not be related to the configuration settings of the network access device 100 may have occurred. The support server 320 may attempt to best diagnose the cause of the disconnection, and may notify the user of the network access device 100 of the disconnection and possible cause, for example, via email, text message, message sent to one of the computing devices 210 and 220 through the cellular modem 120, or using any other communication channel the user may be able access while not connected to the broadband ISP server 240. The support server 320 may also store a record of the disconnection in a database, such that the record may be used to, for example, evaluate the reliability of the broadband ISP that operates the broadband ISP server 240.

FIG. 4 shows an example of a process for setup on a network access device with a backup wide area connection. At 400, a disconnected broadband connection may be detected. For example, the processor 110 may detect that the network access device 100 does not have a broadband connection to the Internet 250 through the broadband modem 230. The network access device 100 may not be properly configured to access the broadband ISP server 240, as the network access device 100 may be new, or may be attempting to connect to the broadband ISP server 240 for the first time due to a user changing their broadband ISP. The network access device 100 and any connected computing devices 210 and 220 may be unable to communicate with devices through the Internet 250 using the broadband connection.

At 402, a support server may be connected to with a cellular modem. For example, the processor 110 may activate the cellular modem 120, which may connect to the Internet 250 through the cellular provider server 310. The cellular modem 120 may connect the network access device 100 to the support server 320, which may be accessible through the Internet 250. The network access device 100 may communicate with the support server 320 through the Internet 250 and cellular provider server 310, across the cellular link 325, using the cellular modem 120.

At 404, identification data may be sent. For example, the processor 110 may gather identification data for the network access device 100 from the storage 150, and the identification data may be sent from the network access device 100 to the support server 320. The identification data may include any information that may be used to identify the network access device 100 to the support server 320, such that the support server 320 may confirm that the network access device 100 is allowed to access the support server 320.

At 406, a request for setup data may be received. For example, the network access device 100 may receive a request for the setup data from the support server 320. The request may specify the specific types of setup data the support server 320 requires in order to automatically determine configuration settings for the network access device 100.

At 408, setup data may be sent. For example, the network access device 100 may send the requested setup data to the support server 320. The processor 110 may gather the requested setup data, for example, from the storage 150 or from any other component of the network access device 100, including any volatile memory installed in the network access device 100.

At 410, configuration data may be received. For example, the network access device 100 may receive configuration data from the support server 320. The configuration data may include configuration settings for use with one or more types of broadband ISP servers that the support server 320 determined should allow the network access device 100 to connect and communicate with the broadband ISP server 240.

At 412, the configuration data may be used to change the configuration of the network access device. For example, the processor 110 may apply configuration settings from the configuration data, replacing conflicting configuration settings in the storage 150. The network access device 100 may then operate using the configuration settings received from the support server 320. The network access device 100 may attempt to connect to the broadband ISP server 240 and the Internet 250. If the connection is successful, the success may be reported to the support server 320. If the connection is unsuccessful, the processor 110 may apply any additional configuration settings in the received configuration data and attempt to connect to the broadband ISP serve 240 again, or may use the cellular modem 120 to request additional configuration settings from the support server 320. If the support server 320 is unable to provide any automatically determined configuration settings that allow the network access device 100 to use the broadband connection, the support server 320 may initiate a guided setup of the network access device 100 or allow a customer support agent's computing device access to the network access device 100 through the cellular modem 120, or may report that no proper configuration settings are available to establish the connection, as the failure to connect may not be due to improper configuration of the network access device 100.

FIG. 5 shows an example of a process for troubleshooting on a network access device with a backup wide area connection. At 500, a disconnected broadband connection may be detected. For example, the processor 110 may detect that the network access device 100 does not have a broadband connection to the Internet 250 through the broadband modem 230. The network access device 100 may have had a previously established connection to the broadband ISP server 240 and the Internet 250 that has been lost. The network access device 100 and any connected computing devices 210 and 220 may be unable to communicate with devices through the Internet 250 using the broadband connection.

At 502, a support server may be connected to with a cellular modem. For example, the processor 110 may activate the cellular modem 120, which may connect to the Internet 250 through the cellular provider server 310.

At 504, identification data may be sent. For example, the processor 110 may gather identification data for the network access device 100 from the storage 150, and the identification data may be sent from the network access 100 to the support server 320.

At 506, a report of the broadband disconnection may be sent. For example, the network access device 100 may send the support server 320 a report including data indicating that a previously connected broadband connection has been disconnected. The report may include any relevant data regarding the disconnection, such as the time of the disconnection, the identity of the broadband ISP, and specific broadband ISP server 240, that network access device 100 was using for the broadband connection, and any error messages received by the network access device 100 or broadband modem 230 when the disconnection occurred.

At 508, a request for debugging data may be received. For example, the network access device 100 may receive a request for debugging data from the support server 320. The request for debugging data may identify specific types of data that may be useful to the support server 320, determined based on, for example, the data in the report of the broadband disconnection. For example, the request for debugging data may include a request for certain configuration settings of the network access device 100.

At 510, the debugging data may be sent. For example, the processor 110 may gather the requested debugging data, for example, from the storage 150, and the debugging data may be sent to the support server 320.

At 512, configuration data may be received. For example, the network access device 100 may receive configuration data from the support server 320. The configuration data may include configuration settings that may restore the disconnected broadband connection. For example, configuration settings received in the configuration data may revert a configuration setting changed by the user to an initial configuration setting that was received from the support server 320 when the network access device 100 was set up, or may change the configuration settings on the network access device 100 to match new configuration settings required by the broadband ISP server 240.

At 514, the configuration data may be used to change the configuration of the network access device. For example, the processor 110 may apply configuration settings from the configuration data, replacing conflicting configuration settings in the storage 150. The network access device 100 may then operate using the configuration settings received from the support server 320. The network access device 100 may attempt to connect to the broadband ISP server 240 and the Internet 250. If the connection is successful, the success may be reported to the support server 320. If the connection is unsuccessful, the processor 110 may use the cellular modem 120 to request additional configuration settings from the support server 320. If the support server 320 is unable to provide any automatically determined configuration settings that allow the network access device 100 to use the broadband connection, the support server 320 may initiate a guided setup of the network access device 100, to assist the user in troubleshooting the network access device 100, or allow a customer support agent's computing device access to the network access device 100 through the cellular modem 120, or may report that no proper configuration settings are available to establish the connection, as the failure to connect may not be due to improper configuration of the network access device 100.

Figure 6:
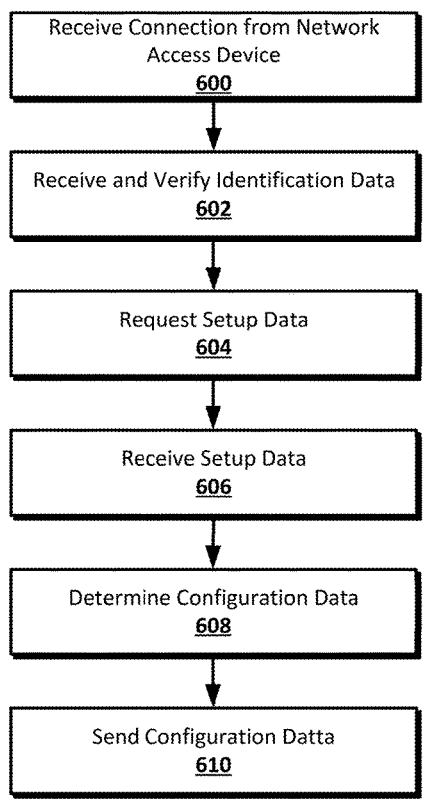
FIG. 6 shows an example of a process for setting up a network access device with a backup wide area connection.

FIG. 6 shows an example of a process for setting up a network access device with a backup wide area connection. At 600, a connection from a network access device may be received. For example, the support server 320 may receive an incoming connection from the network access device 100 through the connection between the support server 320 and the Internet 250. The incoming connection may be established by the cellular modem 120 of the network access device 100.

At 602, identification data may be received and verified. For example, the support server 320 may receive identification data from the network access device 100. The support server 320 may verify the identification data, determining that the network access device 100 is allowed to access the support server 320. If the identification data cannot be verified, for example, because the network access device 100 is not allowed to access the support server 320, the support server 320 may terminate the connection with the network access device 100.

At 604, setup data may be requested. For example, the support server 320 may send a request for setup data to the network access device 100. The request for setup data may include requests for specific types of data, such as current configuration settings, location data, or any other data that the support server 320 determines may be useful in determining proper configuration settings for the network access device 100.

At 606, setup data may be received. For example, the support server 320 may receive the requested setup data from the network access device 100.

At 608, configuration data may be determined. For example, the support server 320 may use the setup data and identification data from the network access device 100 to automatically determine configuration settings for the network access device 100. For example, location data in the setup data may allow the support server 320 to determine which broadband ISP may be serving the location of the network access device. The support server 320 may then determine appropriate configuration settings based on data about the broadband ISP and the identification data for the network access device 100. For example, different configuration settings may be needed for the same broadband ISP depending on the model of the network access device 100. Different models may use different hardware and software. The support server 320 may be unable to determine exact configuration settings for the network access device 100, and may determine several alternative sets of configuration settings, for example one set for each of several possible broadband ISPs that may be serving the location of the network access device 100. The configuration settings may be combined into configuration data.

At 610, configuration data may be sent. For example, the support server 320 may send the automatically determined configuration data to the network access device 100. The configuration data may include any number of the automatically determined configuration settings. For example, the support server 320 may send the network access device 100 configuration data with configuration settings for one broadband ISP, or for multiple broadband ISPs. If the network access device 100 is able to connect to the broadband ISP server 240 and the Internet 250 over the broadband connection after applying the configuration settings in the configuration data sent by the support server 320, the support server 320 may receive a report that the setup of the network access device 100 was successful. The support server 320 may also receive a request for additional configuration data, for example, if the network access device 100 is still unable to use the broadband connection. The support server 320 may send additional configuration data, including previously determined configured settings that weren't sent previously or newly determined configuration settings. The support server 320 may also initiate a guided setup or allow a customer service agent's computing device to access the network access device 100 to complete the setup.

Figure 7:
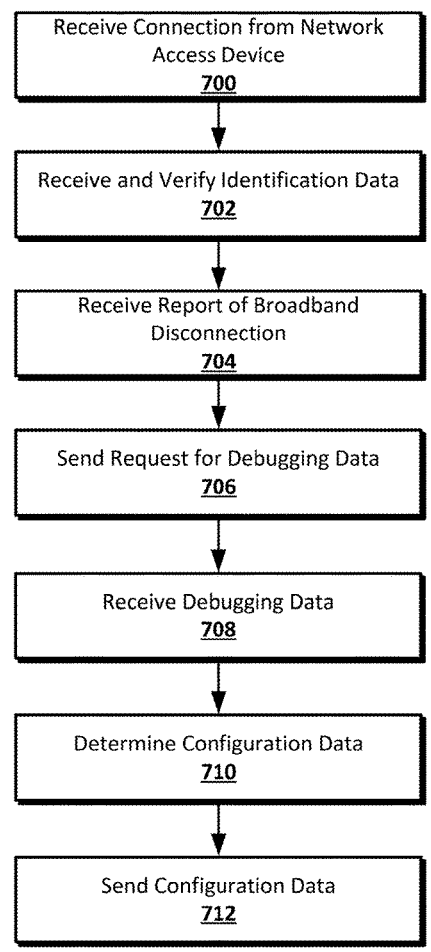
FIG. 7 shows an example of a process for troubleshooting a network access device with a backup wide area connection.

FIG. 7 shows an example of a process for troubleshooting a network access device with a backup wide area connection. At 700, a connection from a network access device may be received. For example, the support server 320 may receive an incoming connection from the network access device 100 through the connection between the support server 320 and the Internet 250. The incoming connection may be established by the cellular modem 120 of the network access device 100.

At 702, identification data may be received and verified. For example, the support server 320 may receive identification data from the network access device 100. The support server 320 may verify the identification data, determining that the network access device 100 is allowed to access the support server 320. If the identification data cannot be verified, for example, because the network access device 100 is not allowed to access the support server 320, the support server 320 may terminate the connection with the network access device 100.

At 704, a report of a broadband disconnection may be received. For example, the support server 320 may receive a report from the network access device 100 including data indicating that a previously connected broadband connection has been disconnected.

At 706, a request for debugging data may be sent. For example, the support server 320 may send a request for debugging data to the network access device 100. The support server 320 may determine what data form the network access device 100 may be useful in troubleshooting the disconnected broadband connection.

At 708, the debugging data may be received. For example, the support server 320 may receive the debugging data from the network access device 100 through the connection established by the cellular modem 120.

At 710, configuration data may be determined. For example, the support server 320 may use the debugging data, identification data, and report of a broadband disconnection from the network access device 100 to automatically determine configuration settings for the network access device 100 that may restore the disconnected broadband connection. The support server 320 may be unable to determine exact configuration settings for the network access device 100, and may determine several alternative sets of configuration settings. The configuration settings may be combined into configuration data.

At 712, configuration data may be sent. For example, the support server 320 may send the automatically determined configuration data to the network access device 100. The configuration data may include any number of the automatically determined configuration settings. If the network access device 100 is able to reconnect to the broadband ISP server 240 and the Internet 250 over the broadband connection after applying the configuration settings in the configuration data sent by the support server 320, the support server 320 may receive a report that the setup of the network access device 100 was successful. The support server 320 may also receive a request for additional configuration data, for example, if the network access device 100 is still unable reconnect the broadband connection. The support server 320 may send additional configuration data, including previously determined configured settings that weren't sent previously or newly determined configuration settings. The support server 320 may also initiate a guided setup or allow a customer service agent's computing device to access the network access device 100 to complete the troubleshooting of the disconnected broadband connection.

Figure 8:
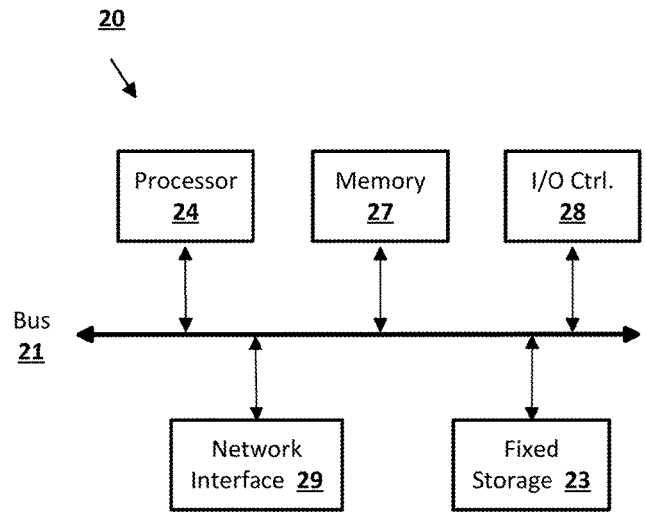
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
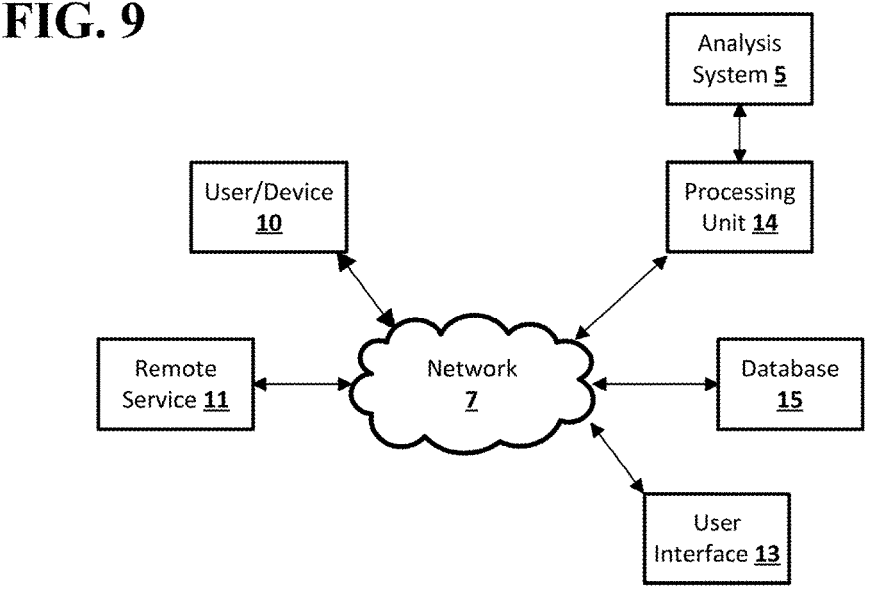
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. An apparatus comprising:
a network interface configured to:
connect to a wide area network over a broadband connection; and
connect to a computing device on a local area network;
a cellular modem configured to connect to the wide area network through a cellular network, the cellular modem distinct from the network interface; and
a processor operatively coupled to the network interface and the cellular modem and, upon an initial startup, configured to:
automatically activate the cellular modem to connect to the cellular network;
receive configuration data using the cellular modem;
apply at least one configuration setting from the received configuration data to change a corresponding configuration of the apparatus;
attempt to connect the broadband connection to the wide area network through the network interface after applying the at least one configuration setting; and
when the attempt to connect the broadband connection to the wide area network fails:
transmit, using the cellular modem, a message over the cellular network to a support server, the message indicating the failed attempt to connect the broadband connection to the wide area network;
receive, using the cellular modem, at least one guided setup web page over the cellular network from the support server, the at least one guided setup web page comprising at least one item of data soliciting an additional configuration setting to be input to the computing device by a user via the at least one guided set up web page;
send, using the network interface, the at least one guided setup web page over the local area network to the computing device;
after the user inputs the additional configuration setting to the computing device, receive, using the network interface, the additional configuration setting over the local area network from the computing device;
apply the received additional configuration setting to change a corresponding configuration of the apparatus; and
re-attempt to connect the broadband connection to the wide area network through the network interface after applying the additional configuration setting.

2. The apparatus of claim 1, further comprising a storage operatively coupled to the processor and configured to:
store configuration settings; and
apply the at least one configuration setting from the received configuration data by storing the at least one configuration setting in the storage.

3. The apparatus of claim 1, wherein the processor is further configured to:
detect that the network interface does not have any configuration settings entered; and
attempt to connect to the broadband connection upon initial startup or responsive to detecting that the network interface does not have any configuration settings.

4. The apparatus of claim 1, wherein the at least one configuration setting comprises at least one of a username and password for a broadband internet service provider (ISP), a static Internet Protocol address, or a connection type.

5. The apparatus of claim 1, wherein the cellular modem is further configured to connect to a computing device connected to the wide area network.

6. The apparatus of claim 5, wherein the computing device connected to the wide area network comprises a customer support agent computing device, and wherein the processor is further configured to receive instructions through the cellular modem from the customer support agent computing device and perform the received instructions.

7. The apparatus of claim 1, wherein the processor is further configured to use the cellular modem to send debugging data and a report of a broadband disconnection, wherein the debugging data is selected from the group consisting of: a current configuration setting of the apparatus, an error log, a debugging log, and telemetry data for the apparatus.

8. The apparatus of claim 1, wherein the network interface comprises at least one of a wireless network interface or a wired network interface.

9. The apparatus of claim 1, wherein the cellular modem comprises a cellular radio, and the cellular radio is a GPRS radio, an EDGE radio, a GSM radio, an LTE radio, a HSPA radio, or an HSDPA radio.

10. The apparatus of claim 1, wherein the broadband connection used by the network interface to connect to the wide area network comprises a connection to a broadband modem connected to a broadband internet service provider server.

11. The apparatus of claim 10, wherein the broadband modem is a cable modem, satellite modem, DSL modem, fiber optic modem, or high-speed wireless wide area modem.

12. A computer-implemented method performed by a data processing apparatus, the computer-implemented method comprising:
detecting that a broadband connection to a wide area network through a network interface is not connected;
connecting, using a cellular modem, to the wide area network, wherein the cellular modem is distinct from the network interface;
sending, using the cellular modem, location data for the data processing apparatus and at least one of identification data, setup data, debugging data, or a report of a broadband disconnection to a support server, the location data indicating a geographic region that the data processing apparatus is presently located in;
receiving, through the cellular modem, configuration data, the configuration data including at least one configuration setting corresponding to a broadband internet service provider (ISP) determined based on the location data;
applying the at least one configuration setting from the configuration data to change a connection setting of the network interface from a first network connection setting to a second network connection setting;
attempting, through the network interface, to reconnect the broadband connection to the wide area network after applying the at least one configuration setting; and
detecting the broadband connection to the wide area network is not connected after the reconnection attempt.

13. The computer-implemented method of claim 12, further comprising:
applying at least one configuration setting from the configuration data that was not previously applied; and
after applying the at least one configuration setting that was not previously applied, attempting to reconnect the broadband connection to the wide area network through the network interface.

14. The computer-implemented method of claim 12, further comprising:
sending a request through the cellular modem to the support server for additional configuration data;
receiving the additional configuration data; and
applying at least one configuration setting from the additional configuration data; and
after applying the at least one configuration setting that was not previously applied, attempting to reconnect the broadband connection to the wide area network through the network interface.

15. The computer-implemented method of claim 12, further comprising:
receiving through the cellular modem from the support server at least one item of data related to at least one guided setup web page;
sending at least one guided setup web page through the network interface to a computing device connected to a local area network, the at least one guided setup web page comprising the at least one item of data, wherein the item of data is an indication of a configuration setting to be input by a user of the computing device;
receiving the configuration setting input by the user;
applying the configuration setting input by the user; and
attempting to reconnect the broadband connection to the wide area network.

16. The computer-implemented method of claim 12, further comprising:
receiving through the cellular modem at least one instruction from a customer support agent computing device; and
performing the at least one instruction, wherein the instruction comprises:
a configuration setting to be applied;
an instruction to initiate a reboot; and
an instruction to attempt to reconnect the broadband connection, or an instruction to send data requested data comprising error log data, telemetry data, or debugging data to the customer support agent computing device.

17. The computer-implemented method of claim 12, wherein the broadband connection to the wide area network is through a broadband modem and a broadband internet service provider server.

18. The computer-implemented method of claim 12, wherein the broadband modem is a cable modem, satellite modem, DSL modem, fiber optic modem or high-speed wireless wide area modem.

19. The computer-implemented method of claim 12, wherein the network interface comprises at least one of a wireless network interface or a wired network interface.

20. The computer-implemented method of claim 12, wherein the at least one configuration setting comprises one item selected from the group of: a connection type setting, a Domain Name System (DNS) Internet Protocol (IP) address, and a Gateway IP address.

21. The computer-implemented method of claim 12, wherein the cellular modem comprises a pre-provisioned cellular radio using a low-bandwidth cellular communication standard.

22. A computer-implemented method performed by a data processing apparatus, the computer-implemented method comprising:
receiving, over a wide area network, location data in at least one of identification data, setup data, debugging data, or a report of a broadband disconnection from a network access device, the location data indicating a geographic region that the network access device is presently located in;
determining at least one first configuration setting to connect a broadband connection for the network access device based on at least one of the identification data, the setup data, the debugging data, or the report of a broadband disconnection;
sending, over the wide area network, the at least one first configuration setting as configuration data to the network access device;
receiving, over the wide area network, a report from the network access device indicating that an attempt to reconnect the broadband connection using the at least one first configuration setting has failed; and
sending, over the wide area network, to the network access device, at least one second configuration setting for connecting the network access device to the broadband connection,
wherein determining the at least one second configuration setting comprises:
determining at least one broadband internet service provider (ISP) that serves the geographic region of the network access device, and
accessing configuration settings for the at least one broadband ISP.

23. The computer-implemented method of claim 22, further comprising:
after receiving the report from the network access device that the broadband connection was not successfully connected after the network access device applied the at least one first configuration setting, performing one or more of:
sending, over the wide area network, at least one item of data related to guided setup to the network access device, and
connecting, over the wide area network, the network access device to a customer support agent computing device.

24. The computer-implemented method of claim 22, further comprising storing the received report of a broadband disconnection.

25. The computer-implemented method of claim 22, further comprising sending a notification of a broadband disconnection to a device accessible by a user of the network access device.

26. A system comprising:
a network interface configured to:
connect to a wide area network over a broadband connection; and
connect to a computing device on a local area network;
a cellular modem pre-provisioned with access to the cellular network of a cellular provider, so that cellular modem may function immediately when the network interface is initially used; and
one or more computers and one or more storage devices storing instructions which are operable, when executed by the one or more computers, to cause the one or more computers to, upon initial startup, automatically perform operations comprising:

connecting, using the cellular mode, to the wide area network, wherein the cellular modem is distinct from the network interface;

sending, using the cellular mode, at least of one of identification data or setup data to a support server;

receiving, using the cellular modem, configuration data comprising at least one configuration setting;

applying the at least one configuration setting from the configuration data to change the configuration of a network access device;

attempting, using the network interface, to connect the wide area network through the broadband connection after applying the at least one configuration setting;

detecting whether the broadband connection to the wide area network is not connected after the connection attempt;

responsive to detecting the broadband connection to the wide area network is not connected after the connection attempt:

transmitting, using the cellular modem, a message over the cellular network to a support server, the message indicating the failed broadband connection;

receiving, using the cellular modem, at least one guided setup web page over the cellular network from the support server, the at least one guided setup web page comprising at least one item of data soliciting an additional configuration setting to be input to the computing device by a user via the at least one guided set up web page;

sending, using the network interface, the at least one guided setup web page over the local area network to the computing device;

after the user inputs the additional configuration setting to the computing device, receiving, using the network interface, the additional configuration setting over the local area network from the computing device;

applying the received additional configuration setting to change a corresponding configuration of the apparatus; and re-attempting to connect the broadband connection to the wide area network through the network interface after applying the additional configuration setting.

* * * * *